May 11, 1937. J. GUTMANN 2,080,265
METHOD OF MAKING CENTER SPOT CROWNS
Filed April 10, 1936
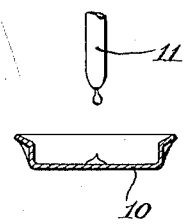
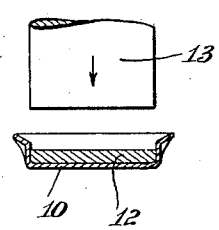
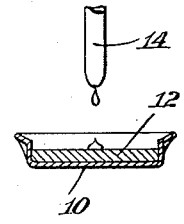
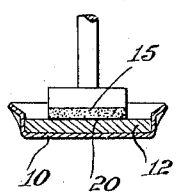
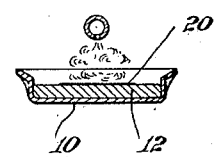
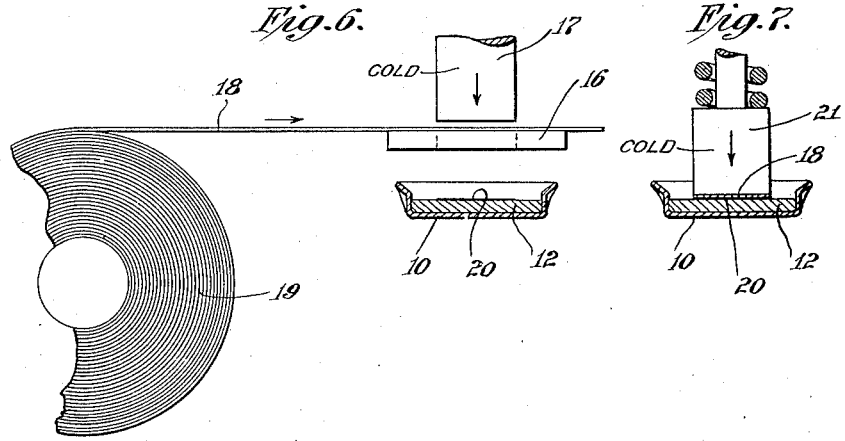
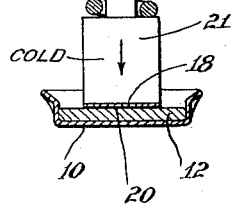
Jesse Gutmann
INVENTOR
BY Frank P. Wentworth
his ATTORNEY.

May 11, 1937

2,080,265

UNITED STATES PATENT OFFICE 2,080,265

METHOD OF MAKING CENTER SPOT CROWNS

Jesse Gutmann, Babylon, N. Y., assignor to Ferdinand Gutmann & Co., Brooklyn, N. Y., a corporation of New York Application April 10, 1936, Serial No. 73,649

11 Claims. (Cl. 113—80)

The invention relates to a method of making center spot crowns, and more particularly to a method in which a disc of material known as a center spot is bonded to the cushion disc of the crown closure without the use of heat in making the adhesive or bonding material tacky.

Center spot crowns have long been made for, and used by bottlers. Such crowns prevent contamination of the contents of a bottle by the material of the cushion disc; prevent disintegration of the material of the cushion disc because of the action of the contents of a bottle thereon, and close small voids in the material of the cushion disc which, after the crown is applied to a bottle, might form minute passages through which gases, with which the liquid contents of a bottle are charged, might escape.

For many years, the universal practice in the production of center spot crowns has been to use a heat fusible medium in bonding the center spot material to the cushion disc. It has been suggested that the center spot be secured to the disc by applying a viscous albumen adhesive to the disc, spreading it thereon preparatory to the depositing of the center spot upon the coated portion of the cushion disc, and subsequently applying heat and pressure to the assembled structure to coagulate the albuminous adhesive and cause it to set. It has also been proposed to apply the center spot to the cushion disc by means of a dry, water soluble adhesive carried by the strip material from which the disc is cut, and applying the center spot disc to a portion of the cushion disc which has applied thereto, throughout the central portion thereof, water or other solvent for the dry adhesive carried by the strip.

Methods employed in connection with the use of a heat fusible adhesive such as a resinous gum, gutta-percha and cellulose derivative cements, have been extensively used whether heat and pressure have been simultaneously applied by means of a heated die throughout the area of the center spot disc, or heat has been applied to the cushion disc immediately prior to the application of pressure by means of a heated or a cold die.

When it has been attempted to apply the center spot to the cushion disc by the second method above referred to, it has been found that the use of a viscous albuminous adhesive prevents a sufficiently strong initial adhesion of the spot material to the material of the cushion disc to avoid a tendency of side slipping of the center spot material when pressure is applied thereto. Such displacement of the disc resulted in a large percentage of crowns so made, having the center spot so far off center in relation to the cushion disc as to make their use in bottling beverages impossible.

While the use of a dry, water soluble adhesive upon the facing strip and a pre-wetting of the face of the cushion disc resulted in a satisfactory bond, it required a slow operation of the machine for applying the spot to the disc. The inability to produce center spot caps at high speeds has made this method commercially impracticable.

Whatever the method employed, it is essential, in the commercial production of center spot caps, that a machine be used in applying the spot to the cushion disc, and that the method be such as to permit the operation of the machine at a high speed, since at the present time the selling price of such caps, as determined by the material of the spot, will range from between twenty-two and thirty-five cents per gross.

When heat fusible adhesives are used, the output capacity is determined by the time interval required to set the adhesive by cooling while it is held under pressure. If the method employed in producing the crown includes the steps of assembling the cushion disc in, and bonding it to, a metal shell, and applying the center spot to the cushion disc with a continuing operation of the same machine, the limitation of the output capacity may result from the time interval required to bond the cushion disc to the metal shell. This last named method has been found desirable in actual practice, since it avoids the use of two machines in completely assembling center spot crowns and minimizes likelihood of mutilation of the decoration upon the metal shell because the shells are tumbled in the feed hopper of only one machine instead of in the hoppers of two machines.

When heat fusible adhesives are used, the crowns are subjected to heat twice while having movement through a machine, which subjects the decorations to increased likelihood of mutilation since scratching of the shells occurs more readily while they are hot than while they are cold.

In assembling methods with which I am familiar, an adhesive having a casein base is used in bonding the cushion disc to the metal shell. With the use of such an adhesive which sets by evaporation of the fluid vehicle of the adhesive, the practice has been to drop the adhesive in the metal shell, spread it, and, by the application of heat, drive off the vehicle to an extent to make the adhesive tacky immediately prior to the deposit of the cushion disc in the shell. When a paper collet, coated with a resinous adhesive is used, the same practice has been followed.

Casein adhesives are an emulsion having low viscosity and, when cold, substantially no tackiness. When subjected to heat, however, the viscosity is rapidly increased, and when the adhesive is almost dry, it is extremely tacky and forms an effective bond between metal and cork, providing, as in all gluing operations, the surfaces to be adhered are pressed tightly together.

Adhesives having a high melting point may be effectively used when the center spots are made of metal foils, since heat may be effectively transmitted by metals to the adhesive. When varnished paper or other materials having low heat conductivity are used for the center spots, adhesives having a low fusing point have been used, since the transmission of heat by such materials is so slow as to make the use of high melting point adhesives impracticable.

With the above conditions in mind, I have developed a method in which casein, or its equivalent, is used as the final binding medium between the center spot and the cushion disc, and in which the casein adhesive has incorporated therewith, as a body or carrier, a substance which at normal temperatures will not adhere to the strip material while in the roll, but nevertheless may be utilized to form an initial bond with the central portion of the cushion disc when said latter is coated with an adhesive material containing the same ingredient.

In the practice of the method of the invention, the adhesive, coated upon the strip material, and a spot of adhesive applied to the cushion disc are, at the time the center spot is applied to the cushion disc, substantially non-tacky yet plastic, so as to avoid spreading of this material upon the application of a momentary pressure to secure an initial adhesion of the spot to the disc, and a continuing pressure during which an effective permanent bond is secured between the spot and the cushion disc. This is desirable since it permits the removal of the crown from a bottle or other container without likelihood of the center spot, the cushion disc, or extruded adhesive adhering to the bottle. By preventing the extrusion of the adhesive material from between the center spot and the cushion disc, and by the use of a body or carrier for the casein adhesive which prevents the adhesive from becoming brittle, there is no likelihood of a portion of the adhesive becoming pulverized while crowns are in the hopper of a filling machine and small particles thereof finding their way into bottles being filled.

The main advantage of the method of the invention, however, is that with the use of an adhesive of the character herein described, and containing a body or carrier therefor which remains plastic but is non-tacky and will readily combine with the same material when pressed into contact therewith, no heat is required during the initial application of the center spot to the cushion disc, and only a cold pressure is required when making the final bond following such initial application of the spot material to the cushion disc. Furthermore, by using a non-hardening plastic for the body or carrier for the adhesive material, there is no deterioration if a crown made by the method of the invention, stands over long periods before being used. In fact, the bond becomes more effective with ageing, since the permanent bond is secured by means of the casein.

Since a fusible adhesive is not employed in the method, the time interval required to form the initial stick between the center spot and the cushion disc is subject to no limitation because of the necessity for transmitting heat to a fusible adhesive, and there is no limitation placed upon the speed in the production of center spot crowns by reason of the necessity for allowing a time interval for the fused adhesive to set while cooling.

A casein adhesive, used in securing the cushion disc to the metal shell, sets by evaporation or volatilization of the fluid vehicle in which the casein is in suspension, or which is absorbed by the casein, and since when the center spot is once firmly pressed down upon the cushion disc, it will be held in intimate relation thereto by the body or carrier for the casein, the final setting of the casein, if desired, may be secured without the simultaneous application of pressure thereto. The method of my invention, however, contemplates a short time interval during which a continuing pressure is applied to the center spot after the first bonding interval, so that the casein constituent of the adhesive may set sufficiently before relieving the pressure, to supplement the action of the body or carrier in preventing displacement of the center spot upon the cushion disc.

The use of a plastic body or carrier for an adhesive which sets under normal temperatures, in securing the center spot disc to the cushion disc prevents crystallization or excessive hardening of the binding material as a whole, and the material of this body or carrier is such that it undergoes no chemical reactions, and will neither harden nor soften, when subjected to sterilization temperatures.

For purposes of definition, the body or carrier in the adhesive used in securing the center spot disc to the cushion disc may be termed an "inert plastic" since, except for oxidation, its characteristics cannot change when it is subjected to temperature changes. It is unlike a vulcanizable rubber compound in the respect that it is not, and does not become tacky. It will, however, readily combine with other similar material in much the same manner that ordinary putties can be combined.

The invention consists primarily in a method of making center spot crowns embodying therein the application to the cushion disc of a bottle closure of a bonding medium containing an adhesive which sets at normal temperatures, and an inert plastic body or carrier therefor, the cutting of a center spot disc from a strip of facing material having one face thereof coated with a bonding medium containing the same body or carrier as is used in the bonding medium applied to the cushion disc, positioning said center spot disc without the application of heat upon said cushion disc to form an initial bond between said discs, and thereafter applying a continuing pressure without heat to said center spot disc; and in such other novel steps and practices as are hereinafter set forth and described, and more particularly pointed out in the claims hereto appended.

Referring to the drawing,

Fig. 1 is a view of a metal shell having an adhesive delivered thereto for securing the cushion disc therein;

Fig. 2 is a view with the cushion disc applied to the metal shell;

Fig. 3 is a view showing the deposit upon the exposed surface of the cushion disc of a drop of bonding medium containing an adhesive and a body or carrier of plastic, non-tacky material;

Fig. 4 is a view showing the spreading of this material within a restricted area about the center of the cushion disc;

Fig. 5 shows a drying out stage for reducing the viscosity of the bonding medium;

Fig. 6 is the stage at which the center spot is cut from the strip material and deposited upon the coated portion of the cushion disc shown in Fig. 5; and Fig. 7 shows the final stage of the method in which a permanent bonding of the center spot to the cushion disc is effected.

Like numerals refer to like parts throughout the several views.

In the practice of the method of my invention, center spot crowns may be produced by a single continuing operation, or by two succeeding operations.

In the procedure first above referred to, a cushion disc may first be placed in a metal shell coated with a bonding medium, and then carried to a position adjacent the strip feeding and spot coating mechanism, and finally to the collecting drum in which the center spot is permanently bonded to the cushion disc.

By the second procedure, the crown may be completely assembled and have the bonding medium applied thereto in one machine, and then be allowed to stand for a time sufficient to permit the removal of the vehicle of the bonding medium before having the center spot applied thereto in a second machine.

The former procedure has the advantage that it requires but a single handling of the constituent parts of a crown in the production of the completed article, although special machinery would be required in order to afford a sufficient time interval for the removal of the fluid vehicle of the adhesive used in attaching the center spot to the cushion disc.

The other method has the advantage that it may be followed in machines now commonly used in the assembling of the parts of a crown, it being required only that one of these machines be modified by the addition thereto of a die and a spotting strip feeding mechanism, and the elimination of those parts of the machine required in applying the cushion disc to the metal shell.

I will first describe the procedure first above referred to in connection with the method of my invention.

With this procedure, the ordinary paper collet, saturated or coated with resinous compound, or a drop of a suitable adhesive from a nozzle 11, is delivered to the metal shell 10. The cushion disc 12 is then deposited in the metal shell upon the adhesive by means of a plunger 13, representing the cork feeding mechanism of an ordinary assembling machine. A drop of bonding medium is then deposited upon the exposed face of the cushion disc 12 by means of a nozzle 14. The spreader then distributes the bonding medium in a thin stratum about the central portion of the face of the cushion disc. No difficulty is experienced in applying this stratum of bonding medium to the cushion disc, since it has low viscosity and is non-tacky. The control of the volume of the bonding medium dropped upon the cushion disc may be by means of a dropper which has long been used in delivering adhesive to the metal shells in assembling the cushion discs therein. The spreading of the bonding medium is effected by a rotatable body 15, the portion of which presented toward the cushion disc is of absorbent material. This spreader also has long been used in spreading adhesive about the metal shell, preparatory to delivering the cushion disc thereto.

Following the spreading of the bonding medium, the cushion disc is submitted to a mild temperature, as indicated in Fig. 5, to hasten the evaporation of the volatile constituent of the bonding medium. Any heating device may be used for this purpose, the gas heater shown in the drawing being merely a conventional showing. The temperature to which the crown is subjected, prior to the delivery of the cushion disc to the metal shell, must be fairly high in the procedure being described.

When the crown approaches the spot cutting die and the strip feeding mechanism, the major portion of the vehicle applied by the dropper 14 will have been removed, but the bonding medium will nevertheless be non-tacky because of the presence of the high percentage of the body or carrier in the bonding medium.

The crown, with the bonding medium applied to the exposed face thereof in the manner described, comes to rest below the cutting die 16 and adjacent the strip feeding mechanism associated therewith, which is not shown in the drawing but is well known in the art of making crown caps, having been used for many years for the feeding of strip material from which paper collets are cut. As the crown comes to rest below the die 16, the male die 17 descends and cuts a center spot disc from the strip 18 and deposits it upon the portion of the cushion disc having the bonding medium applied thereto. The die 17 has sufficient movement to carry the center spot downwardly and press it against the coated portion of the cushion disc.

The strip material 18 may consist of tin foil, aluminum foil, varnished paper or other materials suitable for the making of spots for particular uses. Aluminum foil is used largely for the bottling of beers. Tin foil is used almost exclusively for the bottling of mineral waters, and certain chemical compounds to which tin is neutral. Varnished kraft or express paper is used largely in the production of closures for foodstuffs, fruit juices and soft drinks, being a material long used in various types of closures in the bottling industry for protecting the cushion disc from the contents of a container, and protecting the container from contamination from contact with said cushion disc.

This strip material, shown in a roll at 19, has the inner face thereof or the downwardly presented face, as shown in the drawing, coated with a bonding medium containing the same body or carrier as is used in the bonding medium applied to the cushion disc.

The dies 16 and 17 are cold dies.

No special temperatures are required when securing the center spot to the cushion disc, the method being practiced under normal room temperatures.

When the center spot is cut from the strip 18 and pressed upon the bonding medium applied to the cushion disc shown at 20 in the drawing, the body or carrier in the bonding medium upon the center spot material combines with the body or carrier in the stratum 20, and there is no tendency whatever toward the extrusion of the material of the bonding medium or any side slipping of the center spot disc. The time required to cut the center spot from the strip 18 and apply it to the stratum 20 on the cushion disc is a mere fraction of a second, and yet in this short interval the disc is stuck sufficiently firmly to the stratum 20 to avoid its displacement during the further travel of the crown toward, and its delivery to, the plungers of the collecting drum.

When the crown enters the collecting drum, a spring pressed plunger, indicated at 21, descends upon the center spot and subjects it for a short time interval to a continuing pressure, the duration of which may vary according to the construction of the machine. With machines commonly in use, the time interval between the delivery of a crown to the collecting drum and its discharge from the drum is about nine seconds. The plungers 21, in the method of the invention, are not heated, since no heat is required in forming the permanent bond secured by the continuing application of pressure to the center spot. After the deposit of the center spot upon the stratum 20 and the delivery of the finished crown from the collecting drum, the adhesive contained in the bonding medium applied to the strip material, and in the stratum 20, continues to set, so that the discharged crown, following the ordinary procedures, may be transported and used in a bottling machine without any likelihood of the separation of the center spot from the cushion disc. In fact, a very effective "stick" is secured.

The use of casein or other similar adhesive which sets by evaporation or volatilization of the vehicle, ensures a rapid setting of the bonding medium about the edge of the center spot disc, which is desirable as preventing separation of the disc during the tumbling operation in a bottling machine.

By using a plastic bonding medium upon the strip material, and the same bonding medium upon the cushion disc, and by applying pressure to the exposed face of the spot, the separate strata containing the same bonding medium are combined in a single stratum, the opposite faces of which are already bonded to the spot material and the cushion disc, thus not only permitting a rapid application of the spot to the cushion disc without the possibility of side slipping which would throw the spot off center, but avoiding the necessity for the use of heat in applying the center spot to the cushion disc. The stratum of the bonding medium upon the strip material and upon the center spot disc should be very thin.

In the practice of the method of the invention, I have successfully used a mixture of casein and latex in water suspension, or a thick emulsion of such ingredients. The percentage of the ingredients is substantially three parts of latex to one of casein. This percentage, however, may be varied to secure the desired density or high viscosity of the emulsion.

In making casein emulsions, a low percentage of an alkali, such as calcium hydroxide, is used to prevent precipitation of the casein. In the handling of latex it is also a common practice to use a small percentage of ammonia as a preservative. The calcium hydrate and the ammonia are not used except in the formation of the batch of the bonding medium and do not contribute toward the effectiveness of the bond secured by the method of the invention.

The application of heat to the bonding medium applied to the cushion disc is solely for the purpose of expediting the evaporation of the volatile or fluid constituents of the bonding medium, and when the spot of bonding medium is applied to the cushion disc by one machine and the center spot is subsequently applied by another machine, heat is not essential to cause the drying out of the bonding medium applied to said cushion disc.

When the fluid vehicle is removed from the bonding medium, this medium will not adhere to metal, paper, cork or other materials embodied in a center spot crown, so that the strip material may be wound in a roll without any of the bonding medium adhering to the uncoated face of said material, and the strip may be readily drawn from the roll irrespective of the surrounding temperature.

While the bonding medium may be effectively used in applying center spots of tin, aluminum, oil paper and varnished kraft or express paper and various other materials used for center spots, it is particularly adapted for use in applying paper spots to cushion discs, since no heat is required The essential characteristics of the method of the invention are the application to the cushion disc of a spot of bonding medium containing an ingredient which will maintain the plasticity of the medium and will act as a carrier for an adhesive agent which will set without the application of heat thereto; the depositing of a center spot disc upon the coated portion of the cushion disc, the face of this disc engaging said spot of bonding medium, being coated with a bonding medium having substantially the same properties as the bonding medium applied to the cushion disc; the use of sufficient pressure to the center spot when applying it to the cushion disc to cause the plastic ingredient upon the center spot disc to bond lightly to the spot of bonding medium upon the cushion disc, and finally the application of a cold continuing pressure to the center spot disc to form a more perfect combination of the adhesive stratum upon the center spot disc and the cushion disc, the time interval being such as to permit the setting of the adhesive agent in the bonding medium to an extent to avoid displacement of the center spot in relation to the cushion disc.

It will be noted that following the initial setting of the adhesive, which occurs during the application of continuing pressure, ageing of the crown will have the effect of continuing the setting of the entire mass of adhesive, so that the bond becomes more effective with the lapse of time.

The latex in the bonding medium is subject to no chemical reactions as a result of the practice of the method, and at all times prevents crystallization of the bonding medium, thus preserving flexibility throughout the spot. It is possible that the latex, by absorption of the liquid vehicle, aids in the setting of the adhesive itself, since notwithstanding the tendency of casein adhesive to become hard and brittle when it sets, the bonding medium herein described does not act in this way.

The initial pressure, when applying the center spot disc to the coated portion of the cushion disc, serves merely to temporarily affix the center spot to the cushion disc. The continuing pressure upon the spot, however, has the effect of causing a mechanical combining of the strata of bonding medium upon the center spot and upon the cushion disc, into a single homogeneous stratum of bonding material intermediate the spot and the cushion disc, to each of which the medium is already firmly bonded.

It is not my intention to limit the invention to the particular formula of the bonding medium used, it being essential, however, that one of the ingredients be latex without the addition of any vulcanizing agents, and that an adhesive which will set without the application of heat be carried by the latex. Latex itself does not form a sufficiently strong bond. A casein adhesive does not have sufficient body to avoid side slipping when pressure is applied to the center spot. The admixture herein referred to has been found to give highly satisfactory results in securing a firm stick of the center spot to the cushion disc, and in avoiding extrusion of the bonding medium beyond the edge of the center spot in a manner to cause likelihood of the cushion disc sticking to the neck of a bottle in a manner to interfere with a free removal of the crown.

Having described the invention, what I claim as new and desire to have protected by Letters Patent, is:—

1. A method of making center spot crowns embodying therein the application to the cushion disc of a bottle closure of a bonding medium containing an adhesive which sets at normal temperatures, and an inert plastic body or carrier therefor, the cutting of a center spot disc from a strip of facing material having one face thereof coated with a bonding medium containing the same body or carrier as is used in the bonding medium applied to the cushion disc, positioning said center spot disc without the application of heat upon said cushion disc to form an initial bond between said discs, and thereafter applying a continuing pressure without heat to said center spot disc.

2. A method of making center spot crowns embodying therein the application to the cushion disc of a bottle closure of a thin stratum of a bonding medium containing an adhesive which sets at normal temperatures, and an inert plastic body or carrier therefor, the cutting of a center spot disc from a strip of facing material having upon one face thereof, a stratum of a bonding medium containing the same body or carrier as is used in the stratum of bonding medium applied to the cushion disc, applying pressure to said center spot disc without the application of heat with the stratum of bonding medium thereon in contact with the stratum of bonding medium upon said cushion disc to form an initial bond between said discs, and thereafter combining the strata of bonding mediums into a single homogeneous stratum by applying a continuous pressure without heat to said center spot disc.

3. A method of making center spot crowns embodying therein the application to the cushion disc of a bottle closure of a bonding medium containing an adhesive which sets at normal temperatures, and latex, the cutting of a center spot disc from a strip of facing material having one face thereof coated with a bonding medium containing latex, positioning said center spot disc without the application of heat upon said cushion disc to form an initial bond between said discs, and thereafter applying a continuing pressure without heat to said center spot disc.

4. A method of making center spot crowns embodying therein the application to the cushion disc of a bottle closure of a thin stratum of a bonding medium containing an adhesive which sets at normal temperatures, and latex, the cutting of a center spot disc from a strip of facing material having upon one face thereof a stratum of a bonding medium containing latex, applying pressure to said center spot disc without the application of heat with the stratum of bonding medium thereon in contact with the stratum of bonding medium upon said cushion disc to form an initial bond between said discs, and thereafter combining the strata of bonding mediums into a single homogeneous stratum by applying a continuous pressure without heat to said center spot disc.

5. A method of making center spot crowns embodying therein the application to the cushion disc of a bottle closure of a bonding medium containing a casein adhesive, and an inert plastic body or carrier therefor, the cutting of a center spot disc from a strip of facing material having one face thereof coated with a bonding medium containing the same body or carrier as is used in the bonding medium applied to the cushion disc, positioning said center spot disc without the application of heat upon said cushion disc to form an initial bond between said discs, and thereafter applying a continuing pressure without heat to said center spot disc.

6. A method of making center spot crowns embodying therein the application to the cushion disc of a bottle closure of a thin stratum of a bonding medium containing a casein adhesive, and an inert plastic body or carrier therefor, the cutting of a center spot disc from a strip of facing material having upon one face thereof, a stratum of a bonding medium containing the same body or carrier as is used in the stratum of bonding medium applied to the cushion disc, applying pressure to said center spot disc without the application of heat with the stratum of bonding medium thereon in contact with the stratum of bonding medium upon said cushion disc to form an initial bond between said discs, and thereafter combining the strata of bonding mediums into a single homogeneous stratum by applying a continuous pressure without heat to said center spot disc.

7. A method of making center spot crowns embodying therein the application to the cushion disc of a bottle closure of a bonding medium containing a casein adhesive, and latex, the cutting of a center spot disc from a strip of facing material having one face thereof coated with a bonding medium containing latex, positioning said center spot disc without the application of heat upon said cushion disc to form an initial bond between said discs, and thereafter applying a continuing pressure without heat to said center spot disc.

8. A method of making center spot crowns embodying therein the application to the cushion disc of a bottle closure of a thin stratum of a bonding medium containing a casein adhesive, and latex, the cutting of a center spot disc from a strip of facing material having upon one face thereof a stratum of a bonding medium containing latex, applying pressure to said center spot disc without the application of heat with the stratum of bonding medium thereon in contact with the stratum of bonding medium upon said cushion disc to form an initial bond between said discs, and thereafter combining the strata of bonding mediums into a single homogeneous stratum by applying a continuous pressure without heat to said center spot disc.

9. A method of making center spot crowns embodying therein the application to the cushion disc of a bottle closure of a thin stratum of a bonding medium containing a casein adhesive, and latex, the proportions of casein and latex being substantially one to three, the cutting of a center spot disc from a strip of facing material having upon one face thereof a stratum of a bonding medium containing latex, applying pressure to said center spot disc without the application of heat with the stratum of bonding medium thereon in contact with the stratum of bonding medium upon said cushion disc to form an initial bond between said discs, and thereafter combining the strata of bonding mediums into a single homogeneous stratum by applying a continuous pressure without heat to said center spot disc.

10. A method of making center spot crowns embodying therein the cutting of a center spot disc from a strip of facing material having on one face thereof a thin coating of a non-tacky bonding medium containing a water soluble adhesive which sets at normal temperatures, and a soluble inert plastic body or carrier therefor, and having water of solution evaporated therefrom, the application to the cushion disc of a bottle closure of a thin coating of a non-tacky bonding medium containing a water soluble inert plastic from which water of solution has been evaporated, positioning said center spot disc without the application of heat on the bonding medium upon said cushion disc, and thereafter applying cold pressure to said center spot disc, whereby the bonding media upon said center spot disc and upon said cushion disc will be combined into a homogeneous stratum.

11. A method of making center spot crowns embodying therein the delivery of adhesive in the metal shell of the crown, the deposit of a cushion disc upon the adhesive, the application to the cushion disc of a bottle closure of a bonding medium containing an adhesive which sets at normal temperatures, and an inert plastic body or carrier therefor, the cutting of a center spot disc from a strip of facing material having one face thereof coated with a bonding medium containing the same body or carrier as is used in the bonding medium applied to the cushion disc, positioning said center spot disc without the application of heat upon said cushion disc to form an initial bond between said discs, and thereafter applying a continuing pressure without heat to said center spot disc.

JESSE GUTMANN.